United States Patent
Bottlang et al.

(10) Patent No.: US 8,768,546 B2
(45) Date of Patent: Jul. 1, 2014

(54) METHOD FOR CONTROLLING A RAILWAY VEHICLE

(75) Inventors: Holger Bottlang, Radolfszell (DE); Ingo Lehmann, Owingen (DE); Michael Willmann, Bermatingen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 208 days.

(21) Appl. No.: 13/259,939

(22) PCT Filed: Mar. 11, 2010

(86) PCT No.: PCT/EP2010/001510
§ 371 (c)(1),
(2), (4) Date: Oct. 27, 2011

(87) PCT Pub. No.: WO2010/108595
PCT Pub. Date: Sep. 30, 2010

(65) Prior Publication Data
US 2012/0035791 A1    Feb. 9, 2012

(30) Foreign Application Priority Data
Mar. 24, 2009    (DE) .................. 10 2009 014 591

(51) Int. Cl.
*B61C 9/08*    (2006.01)
(52) U.S. Cl.
USPC ............................................. 701/20
(58) Field of Classification Search
USPC ............................................. 701/20
See application file for complete search history.

(56) References Cited

U.S. PATENT DOCUMENTS

| | | | | |
|---|---|---|---|---|
| 7,618,011 | B2 * | 11/2009 | Oleski et al. | 246/167 R |
| 2006/0138285 | A1 | 6/2006 | Oleski et al. | |
| 2007/0137514 | A1 | 6/2007 | Kumar | |
| 2007/0219683 | A1 * | 9/2007 | Daum et al. | 701/19 |
| 2008/0082223 | A1 * | 4/2008 | Daum et al. | 701/19 |
| 2011/0118914 | A1 * | 5/2011 | Brooks et al. | 701/20 |

FOREIGN PATENT DOCUMENTS

| | | |
|---|---|---|
| DE | 8 14 604 | 9/1951 |
| DE | 814904 | 9/1951 |
| DE | 1455052 | 6/1969 |
| DE | 14 38 782 | 9/1969 |
| DE | 255132 A | 3/1988 |
| DE | 195 48 286 | 3/1997 |
| DE | 195 45 008 | 6/1997 |
| DE | 198 50 051 | 5/2000 |

(Continued)

*Primary Examiner* — Mary Cheung
*Assistant Examiner* — Michael Berns
(74) *Attorney, Agent, or Firm* — Lucas & Mercanti, LLP; Klaus P. Stoffel

(57) ABSTRACT

The invention relates to a method for controlling a railway vehicle having a double drive system, wherein each drive system comprises an internal combustion engine and a transmission unit, wherein a target drive torque (M(SL)) is provided as a power requirement by means of a drive lever, wherein an actual drive torque (M(IST)) of the railway vehicle is determined and a drive torque deviation is calculated from the target drive torque (M(SL)) and the actual drive torque (M(IST)). The method further comprises determining a prediction drive type (AAP), and a target drive type (AA(SL)) in the sense of a single or double drive, a target operating point (BP(SL)), and a target transmission stage (US(SL)) are set for the transmission units, based on the drive torque deviation and the prediction drive type (AAP), by means of a traction manager (9).

6 Claims, 3 Drawing Sheets

(56) References Cited

FOREIGN PATENT DOCUMENTS

| DE | 199 33 688 | 12/2000 |
| DE | 102 26 143 | 1/2004 |
| DE | 102007047178 | 4/2008 |
| DE | 20 2007 018 504 | 9/2008 |
| DE | 10 2007 049 755 | 4/2009 |
| EP | 1 537 315 | 6/2005 |
| WO | 2004/022954 | 3/2004 |

* cited by examiner

METHOD FOR CONTROLLING A RAILWAY VEHICLE

The present application is a 371 of International application PCT/EP2010/001510 filed Mar. 11, 2010, which claims priority of DE 10 2009 014 591.5, filed Mar. 24, 2009, the priority of these applications is hereby claimed and these applications are incorporated herein by reference.

BACKGROUND OF THE INVENTION

The invention concerns a method for controlling a railway vehicle with a twin power plant, where each power plant comprises an internal combustion engine and a transmission unit, wherein a deviation of the set value and actual value of the drive torque and a prediction drive type are used to determine, by means of a traction manager, a set drive type in the sense of a single or double drive, a set operating point, and a set transmission stage for the transmission units.

In a railway vehicle with a twin power plant, the set drive torque is preset by a drive lever, which is then set by a train control unit as a default value for the internal combustion engines on a data bus, for example, a CAN bus. Due to the parallel drive, it is guaranteed that each internal combustion engine produces approximately the same drive power within the usual tolerances. When a twin power plant is used, the internal combustion engines are usually designed for maximum acceleration of the railway vehicle. During the acceleration process, the internal combustion engines are operated on the full-load curve of the engine performance map. After the maximum permissible vehicle speed has been reached, only the drive power needed to maintain the steady-state condition is still required. In the steady-state condition, therefore, the operating points of the internal combustion engines in the engine performance map lie in a range with distinctly higher fuel consumption. The problem in this respect is that higher fuel consumption sets in despite the lower power output.

A measure for improving this situation is disclosed by DE 1 455 052 OS, which describes a twin power plant and a control method for a railway vehicle. The twin power plant comprises a main diesel engine and an auxiliary diesel engine, a transmission, a generator, an electric controller, and an electric motor. The main diesel engine drives a generator, which in turn is connected by a shaft with the transmission. The auxiliary diesel engine is likewise connected with the transmission. The electric motor is arranged on the drive shaft of the transmission as an additional drive. The generator, the electric controller, and the electric motor describe a diesel electric drive path. In a first operating state corresponding to standstill of the railway vehicle, the main diesel engine is activated, while the auxiliary diesel engine and the transmission are deactivated. The current generated by the generator is used exclusively for preheating the train and for supplying power to other current consumers. In a second operating state corresponding to a low driving power requirement, the main diesel engine and the transmission are activated, while the auxiliary diesel engine remains deactivated. In its low and middle speed range, the main diesel engine drives the drive wheelsets via the transmission. To improve the engine efficiency, a portion of the engine output is transmitted parallel to the drive wheelsets via the electric drive connection, namely, via the generator, the controller and the electric motor. In a third operating state corresponding to a high power requirement, the main diesel engine and the auxiliary diesel engine are the common power source in the upper speed range up to the maximum speed. Here too, a portion of the engine output of the main diesel engine is transmitted by electric paths to the drive wheelsets to allow the main diesel engine to operate in the region of the most favorable fuel consumption.

Another measure is known from DE 814 904 PS, which discloses a twin power plant with two identical drivetrains. Each power plant comprises a diesel engine and a transmission system in the form of a generator and electric direct drive motors for driving the wheelsets. Both generators are mechanically connected by couplings on the output side with a reduction gear, which in turn drives the auxiliary equipment. Auxiliary equipment includes, for example, radiator fans, brake compressors, and the generators for generating the on-board supply voltage. The characteristic feature is that the auxiliary equipment that is essential for the operation can be optionally coupled with one or the other of the engines, which can be adjusted to constant total output, so that the internal combustion engine that is provided for driving the railway vehicle is operated in the region of favorable fuel consumption, while the other internal combustion engine drives the auxiliary equipment.

Although both of the measures described above result in reduced fuel consumption, they do not exhaust all possibilities for fuel savings.

SUMMARY OF THE INVENTION

The objective of the invention is to contrive a method for controlling a railway vehicle with a twin power plant which allows further fuel savings.

The method for controlling the twin power plant consists in first computing a drive torque deviation from a set drive torque, which is preset as a desired power by means of the throttle control, and an actual drive torque of the railway vehicle. The drive torque deviation and a prediction drive type are then used to determine, by means of a traction manager, a set drive type in the sense of a single or double drive, a set operating point for the given internal combustion engine, and a set transmission stage for the transmission units. In accordance with the invention, transmission units are understood to be a generator/electric motor unit as a diesel-electric drive, an automatic power shift transmission, or a hydrodynamic power transmission. The central idea of the invention is that in the steady-state condition, the internal combustion engine provided for propulsion is adjusted to an operating point near the full-load curve, and the other internal combustion engine is adjusted to an operating point near the idle speed, such that the consideration of the prediction drive type makes an essential contribution to the fuel savings. Therefore, the operator's operating costs are reduced.

The prediction drive type is determined before the trip start by reading the electronic railroad schedule into the train control unit, and the prediction drive types of the railway vehicle specific to the route sections are determined in advance. During the driving operation, the prediction drive type is then determined by determining a position deviation of the actual position from a set position of the railway vehicle determined from the electronic railroad schedule, computing a time allowance on the basis of the position deviation, and proposing either the keeping or changing of the prediction drive type as a function of the time allowance. Thus, for example, in the case of a negative time allowance in the sense of the train running late, a prediction drive type of higher power output is proposed.

In a modification of the invention, it is proposed that in the determination of the set drive type and the set operating point, substantial consideration be given to a load spectrum determined over the operating period. For the load spectrum, for example, the actual drive torque or the engine speed of the set operating point is recorded by a load spectrum recorder. Consequently, uniform loading of the internal combustion engines is achieved by means of the load spectrum, and this in turn results in equal maintenance intervals. In determining the set drive type, the level of filling of the engine fluids, for example, fuel, coolant, oil and SCR fluid, are likewise taken into account.

The drawings illustrate a preferred embodiment of the invention.

DETAILED DESCRIPTION OF THE INVENTION

Figure 1:
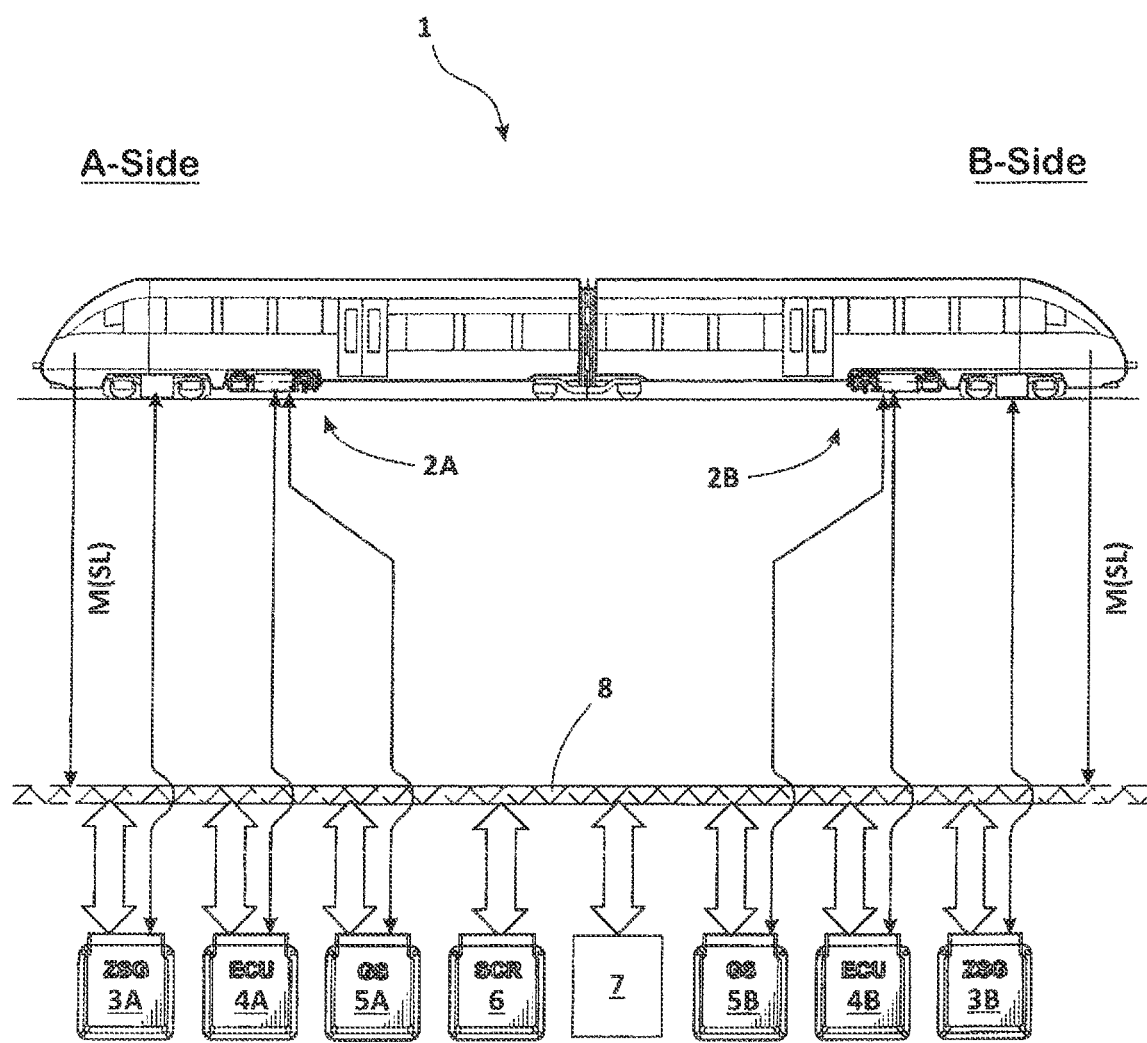
FIG. 1 shows a system diagram.

FIG. 1 shows a system diagram of a railroad vehicle 1; here: a railway motorcar with a twin power plant. However, the invention can also be used with more than two power plants. The railway vehicle 1 has an A side and a B side. Accordingly, in the drawings and in the text, the parts on the left are labeled with the appendix A and those on the right are labeled with the appendix B. Each power plant, for example, the power plant 2A, consists of an internal combustion engine and a transmission unit for transmitting torque from the internal combustion engine to the drive wheels. In accordance with the invention, a transmission unit is understood to be a generator/electric motor unit for a diesel-electric drive, an automatic power shift transmission, or a hydrodynamic power transmission. The power plants 2A and 2B are constructed symmetrically and identically with internal combustion engines of equal power output.

The electronic control units are connected to a common electronic data bus 8, for example, a CAN bus system or Ethernet. For the A-side part of the railway vehicle, these electronic control units are a train control unit 3A (ZSG), an engine control unit 4A (ECU), and a transmission control unit 5A (GS). In addition, a control unit 6 (SCR) for determining the exhaust gas is connected. The control units 3 to 6 connected to the data bus 8 are both receivers and transmitters. Also connected to the data bus 8 are a receiving unit 7 for receiving the railroad radio link and the GPS data. The electronic railroad schedule with stored electronic route map is applied to the data bus 8 by means of the railroad radio link. The GPS data comprise the actual position and the actual elevation. The set value of the set drive torque M(SL) is preassigned by the motor car engineer by means of a throttle control. The receiving unit 7 and the throttle control for preassignment of the set drive torque M(SL) are exclusively transmitters on the data bus 8.

The boundary conditions during the operation of a railway vehicle are preassigned by the electronic railroad schedule, which—as is well known—is read into the train control unit by radio link before the trip start. The travel speeds specific to the route sections and thus the time frame between two waypoints are stored in the electronic railroad schedule. Before the trip start, the drive types of the railway vehicle that are specific to the route sections are predictively determined by means of the electronic railroad schedule. In the remaining text, this is referred to as the prediction drive type. During the driving operation, a determination is made of a position deviation of the actual position from a set position of the railway vehicle determined from the electronic railroad schedule. The position deviation in turn is used to compute a time allowance. The time allowance is then used to propose either to keep the prediction drive type, i.e., at the current drive power, or to change the prediction drive type, i.e., to a higher or lower drive power. In a further step, the invention now provides that a deviation of the actual drive torque from the set drive torque is computed and, function of this drive torque deviation and the prediction drive type, a traction manager determines a set drive type in the sense of a single or double drive, a set operating point for the internal combustion engines, and a set transmission stage for the transmission units.

Figure 2:
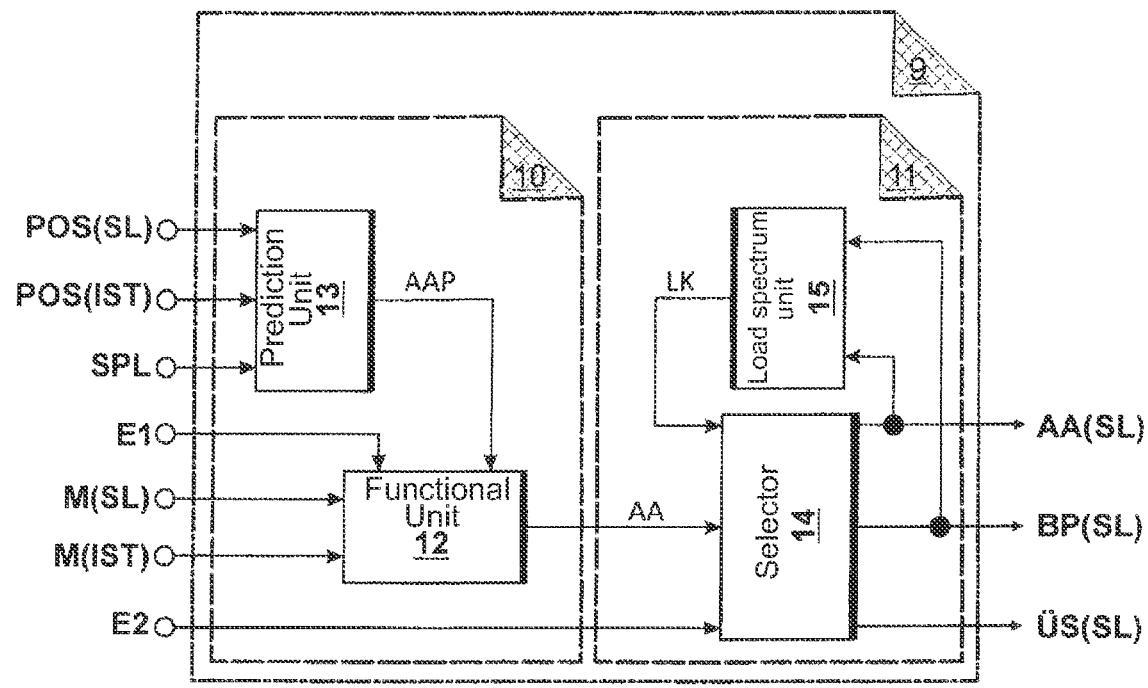
FIG. 2 shows a traction manager in the form of a functional block diagram.

FIG. 2 shows the traction manager, whose individual blocks are part of an executable program. The input variables are the set drive torque M(SL), the actual drive torque M(IST), the set position POS(SL), the actual position POS(IST), the electronic railroad schedule SPL, a first input variable E1 and a second input variable E2. The output variables are a set drive type AA(SL), a set operating point BP(SL) for the internal combustion engines, and a set transmission stage ÜS(SL) for transmission units, for example an automatic power shift transmission. The triggering signals are applied to the data bus and converted to the corresponding control signal by the appropriate control unit. For example, in an internal combustion engine with a common rail system, these would be a PWM signal for driving the suction throttle and the triggering signal for the injectors (injection start/injection end). The traction manager 9 contains an operating strategy unit 10 and a verification unit 11 as functional units. The operating strategy unit 10 in turn contains a functional block 12 and a prediction unit 13. The verification unit 11 comprises a selector 14 and a load spectrum unit 15.

Within the operating strategy unit 10, the prediction unit 13 determines the prediction drive types AAP specific to the route sections before the trip start on the basis of the electronic railroad schedule SPL. During the driving operation, the prediction drive type AAP is then determined by means of the prediction unit 13 as a function of a position deviation of the actual position POS(IST) from the set position POS(SL) of the railway vehicle determined from the electronic railroad schedule SPL. In the functional block 12, a drive torque deviation is computed from the set drive torque M(SL) and the actual drive torque M(IST). The recommended prediction drive type AAP, which characterizes the recommended drive power, and the drive torque deviation are then used to determine the drive type AA. In addition, the first input variable E1, which characterizes the state of the total system, is also taken into consideration. Within the verification unit 11, the selector 14 uses the drive type AA, a load spectrum LK, and the second input variable E2 to determine the set drive type AA(SL) in the sense of a single or double drive, the set operating point BP(SL) for the A-side and B-side internal combustion engine, and the set transmission stage ÜS(SL) for the transmission units. The set drive type AA(SL) and the set operating point BP(SL) are recorded in a load spectrum recorder by the load spectrum unit 14. The load spectrum unit 14 ensures that in the verification of the set quantities, the power plants are uniformly loaded over the operating period. The input variable E2 incorporates the level of filling of an SCR tank and the fuel reserve.

During the acceleration phase of the railway vehicle, the traction manager 9 outputs double drive as the set drive type AA(SL) and a value on the full-load curve as the set operating point BP(SL). When an automatic power shift transmission is used, the traction manager 9 presets the value AUTO as the set transmission stage ÜS(SL), i.e., the electronic transmission control unit (FIG. 1: 5A, 5B) automatically determines the transmission stage, for example, as a function of the transmission output speed. When a hydrodynamic power transmission is used, the traction manager 9 presets a gear. In the steady-state condition of the railway vehicle, i.e., at a constant travel speed, the traction manager 9 presets single drive as the set drive type AA(SL). A value on the full-load curve is preset as the set operating point, for example, for the A-side internal combustion engine, while either idling or deactivation is set as the set operating point for the B-side internal combustion engine. When an automatic power shift transmission is used, the traction manager 9 presets the value AUTO as the set transmission stage ÜS(SL) for the A-side power shift transmission and neutral for the B-side power shift transmission. During the process of braking the railway vehicle, the traction manager 9 outputs double drive as the set drive type AA(SL) and a constant as the set operating point BP(SL). When an automatic power shift transmission is used, the traction manager 9 presets the value AUTO as the set transmission stage. In the railway station, the traction manager 9 presets single drive as the set drive type AA(SL). Accordingly, the set operating point BP(SL) for, e.g., the A-side internal combustion engine, is idle, while the B-side internal combustion engine is deactivated. When an automatic power shift transmission is used, the traction manager 9 presets the value AUTO as the set transmission stage ÜS(SL). When a hydrodynamic power transmission is used, the traction manager 9 presets the value zero.

Figure 3:
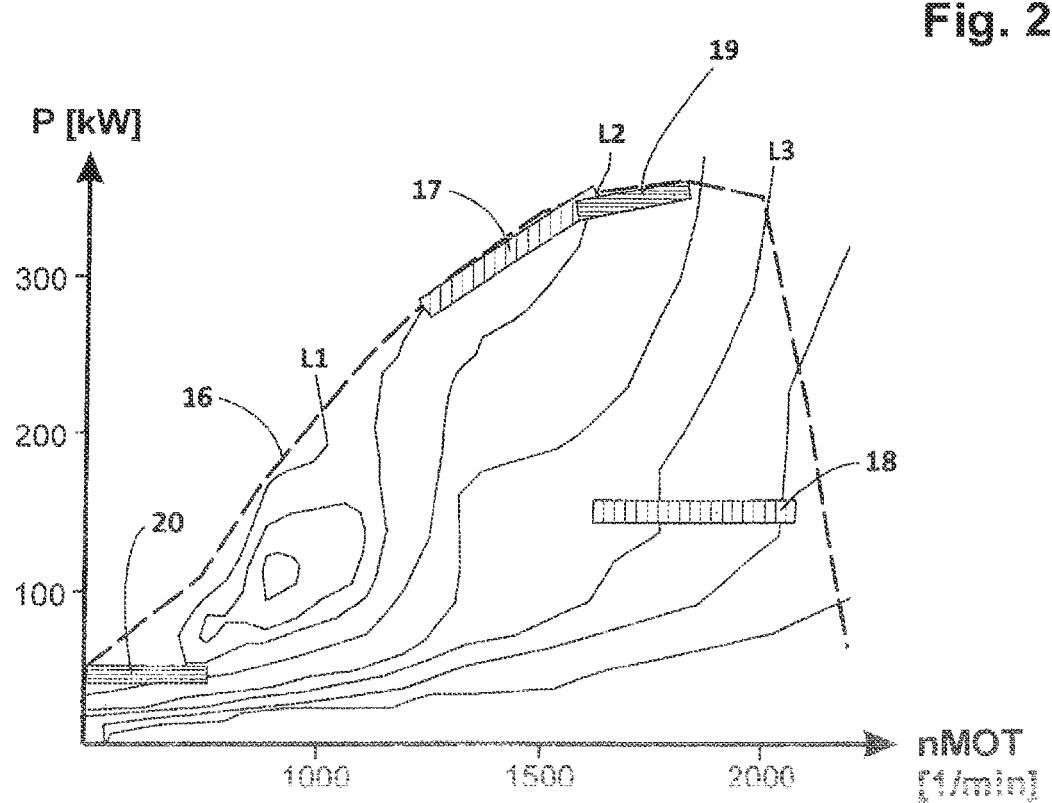
FIG. 3 shows an engine performance map.

FIG. 3 shows an engine performance map, in which the engine speed nMOT is plotted on the x-axis, and the engine power output P is plotted on the y-axis. Lines of equal specific fuel consumption are plotted within the performance map. For example, the line L1 shows a specific fuel consumption of 190 g/kWh, the line L2 a specific fuel consumption of 200 g/kWh, and the line L3 a specific fuel consumption of 230 g/kWh. The broken line 16 represents the full-load curve. For maximum acceleration of the railway vehicle, the internal combustion engines are operated on the full-load curve 16 of the engine performance map. As an example, this is illustrated with the acceleration zone 17. After the maximum permissible travel speed has been attained, for example, 120 km/h, a much lower drive power is necessary to maintain the steady-state condition. Therefore, the two internal combustion engines are operated in a steady-state zone 18 in the engine performance map. However, the steady-state zone 18 lies on the line L3, which designates a higher fuel consumption than the line L2. In short: the set operating points of the internal combustion engines lie in the engine performance map in a region with significantly higher specific fuel consumption. The invention now provides that in the steady state, the traction manager 9 causes, for example, the A-side internal combustion engine to be operated at an operating point in the full-load zone 19 on the full-load curve 16, while, on the other hand, the B-side internal combustion engine is caused to be operated at an operating point in the idling zone 20.

Figures 4, 5:
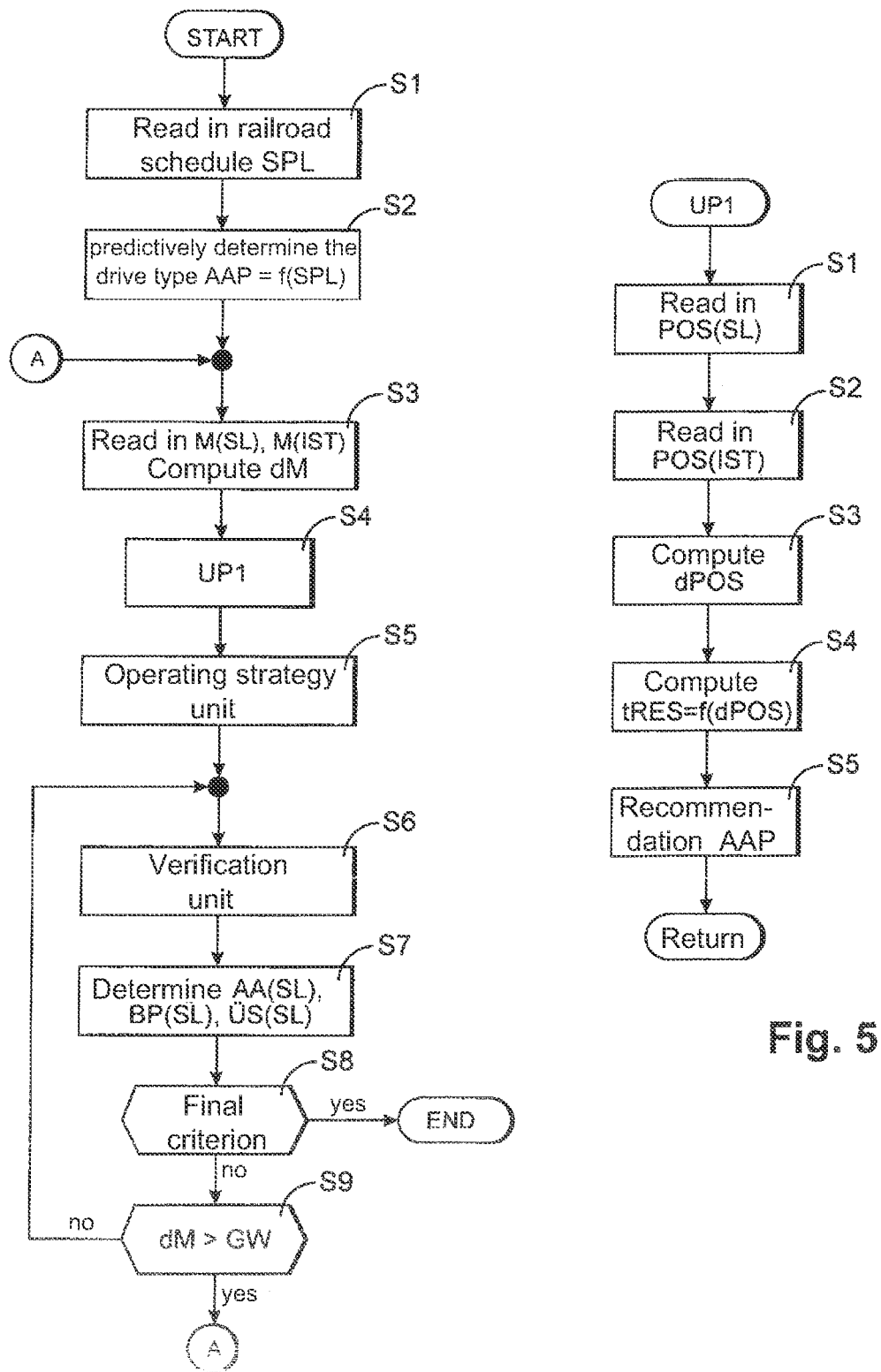
FIG. 4 shows a program flowchart.
FIG. 5 shows a subroutine UP1.

FIG. 4 shows a program flowchart. At S1 the electronic railroad schedule SPL with the stored route map are read in via the railroad radio link and stored in the train control unit. Before the start of the trip, at S2 the prediction drive types AAP specific to the route sections are determined in advance as a function of the railroad schedule SPL and stored. At S3 the set drive torque M(SL) and the actual drive torque M(IST) are read in, and then the drive torque deviation dM is computed. At S4 control of the program passes to a subroutine UP1 for determining the prediction drive type AAP during the operation of the railway vehicle. The subroutine UP1 is shown in FIG. 5 and will be explained with reference to it. After control is returned from the subroutine UP1 to the main program, at S5 the operating strategy unit (FIG. 2: 10) determines a drive type, which is then evaluated at S6 by the verification unit (FIG. 2: 11). At S7 the set drive type AA(SL) in the sense of a single or double drive, a set operating point BP(SL), and a set transmission stage ÜS(SL) for the transmission units are determined and set on the data bus. At S8 a check is made to determine whether a final criterion is present. If this is the case (interrogation result S8: yes), the program ends. If no final criterion was detected (interrogation result S8: no), then at S9 the drive torque deviation dM is compared with a threshold value GW. If the set drive torque M(SL) and the actual drive torque M(IST) differ only slightly (interrogation result S9: no), program control returns to S6. If the drive torque deviation dM is greater than the threshold value GW (interrogation result s9: yes), program control returns to S3.

FIG. 5 shows the subroutine UP1, by which the prediction drive type AAP is computed as a recommendation. At S1 the set position POS(SL) of the railway vehicle is determined on the basis of the railroad schedule and the time. At S2 the actual position POS(IST) is read in via the GPS system, and then at S3 a position deviation dPOS is determined. The position deviation dPOS in turn is used determine a time allowance tRES at S4, and at S5 it is evaluated and a prediction drive type AAP is recommended. The time allowance indicates whether the railway vehicle will reach the next waypoint on time or too early or late. If the time allowance tRES lies within a tolerance range, it is recommended that the prediction drive type AAP be maintained. If the time allowance tRES lies outside the tolerance range and is negative in the sense of a late arrival, a prediction drive type AAP with a higher power output is recommended. If the time allowance tRES lies outside the tolerance range and is positive in the sense of an early arrival, a prediction drive type AAP with the lowest power consumption is recommended. Program control then returns to the main program shown in FIG. 4.

Overall, the invention offers the advantage of still further reduced fuel consumption by virtue of the fact that the traction manager, in conjunction with prediction involving the use of the electronic railroad schedule and the elevation profile, allows an anticipatory drive type. This reduces the operator's operating costs.

REFERENCE NUMBERS 1 railway vehicle
2A, 2B power plant
3A, 3B train control unit
4A, 4B engine control unit
5A, 5B transmission control unit
6 SCR control unit
7 receiving unit
8 data bus
9 traction manager
10 operating strategy
11 verification unit
12 functional block
13 prediction unit
14 selector
15 load spectrum unit
16 full-load curve
17 acceleration zone
18 steady-state zone
19 full-load zone
20 idling zone

The invention claimed is:

1. A method for controlling a railway vehicle with a twin power plant, where each power plant comprises an internal combustion engine and a transmission unit, the method comprising the steps of: presetting a set drive torque (M(SL)) as a desired power by a throttle control; determining an actual drive torque (M(IST)) of the railway vehicle; computing a drive torque deviation (dM) of the actual drive torque (M(IST)) from the set drive torque (M(SL)); determining a prediction drive type (AAP); and, determining a set drive type (AA(SL)) in the sense of a single or double drive, a set operating point (BP(SL)), and a set transmission stage (ÜS (SL)) for the transmission units by a traction manager as a function of the drive torque deviation (dM) and the prediction drive type (AAP).

2. The method in accordance with claim 1, including recording a load spectrum of the internal combustion engines, and giving substantial consideration to the load spectrum in determining the set drive type (AA(SL)) and the set operating point (BP(SL)).

3. The method in accordance with claim 2 including considering a level of filling of the engine fluids in the determination of the set drive type (AA(SL)).

4. The method in accordance with claim 1, including determining the prediction drive type (AAP) by reading an electronic railroad schedule (SPL) as travel velocities specific to route sections into a train control unit, determining, before a start of the trip, prediction drive types (AAP) of the railway vehicle specific to the route sections in advance by the electronic railroad schedule (SPL), determining, during driving operation, a position deviation (dPOS) of an actual position (POS(IST)) from a set position (POS(SL)) of the railway vehicle determined from the electronic railroad schedule, computing a time allowance (tRES) based on the position deviation (dPOS), and then proposing, as a function of the time allowance (tRES), either to keep the prediction drive type (AAP) or to change the prediction drive type (AAP).

5. The method in accordance with claim 4, including proposing a prediction drive type (AAP) with a higher power output if the time allowance (tRES) is negative in the sense of a late arrival, proposing that the current prediction drive type (AAP) be maintained if the time allowance (tRES) lies within a tolerance range, and proposing a prediction drive type (AAP) with a lowest power consumption if the time allowance (tRES) is positive in the sense of an early arrival.

6. The method in accordance with claim 1, wherein in a steady state operating condition of the railway vehicle the traction manager causes the internal combustion engine of one power plant to be operated at an operating point in a full-load zone of a full-load curve of an engine performance map, and causes the internal combustion engine of the other power plant to be operated at an operating point in an idling zone of the engine performance map.

* * * * *